US010473541B2

(12) United States Patent
Hull et al.

(10) Patent No.: US 10,473,541 B2
(45) Date of Patent: Nov. 12, 2019

(54) DEVICE AND SYSTEM FOR DETECTING DYNAMIC STRAIN

(71) Applicant: Hifi Engineering Inc., Calgary (CA)

(72) Inventors: John Hull, Calgary (CA); Seyed Ehsan Jalilian, Calgary (CA)

(73) Assignee: Hifi Engineering Inc., Calgary, Alberta (CA)

( * ) Notice: Subject to any disclaimer, the term of this patent is extended or adjusted under 35 U.S.C. 154(b) by 0 days.

(21) Appl. No.: 15/323,932

(22) PCT Filed: Jul. 4, 2014

(86) PCT No.: PCT/CA2014/050644
§ 371 (c)(1),
(2) Date: Jan. 4, 2017

(87) PCT Pub. No.: WO2016/000063
PCT Pub. Date: Jan. 7, 2016

(65) Prior Publication Data
US 2017/0153154 A1    Jun. 1, 2017

(51) Int. Cl.
*G01B 9/02* (2006.01)
*G01L 1/24* (2006.01)
*G01D 5/353* (2006.01)

(52) U.S. Cl.
CPC .......... *G01L 1/246* (2013.01); *G01D 5/35316* (2013.01)

(58) Field of Classification Search
CPC .......... G01L 1/24; G01L 1/242; G01L 1/246; G02B 6/0208; G02B 6/02209;
(Continued)

(56) References Cited

U.S. PATENT DOCUMENTS 6,233,374 B1   5/2001   Ogle et al.
6,785,004 B2   8/2004   Kersey et al.
(Continued)

FOREIGN PATENT DOCUMENTS

WO    WO2013/102252 A1    7/2013

OTHER PUBLICATIONS

International Search Report and Written Opinion of the International Searching Authority, dated Apr. 1, 2015, for corresponding International Application No. PCT/CA2014/050644, 8 pages.
(Continued)

*Primary Examiner* — Kara E. Geisel
*Assistant Examiner* — Jonathon Cook
(74) *Attorney, Agent, or Firm* — Klarquist Sparkman, LLP

(57) ABSTRACT

A device and system for detecting dynamic strain. The device comprises a longitudinally extending carrier and an optical fiber embedded along an outer surface of a length of the carrier. The optical fiber comprises at least one pair of fiber Bragg gratings (FBGs) tuned to reflect substantially identical wavelengths. The system comprises the device and an interrogator comprising a laser source and a photodetector. The interrogator is configured to perform interferometry by shining laser light along the optical fiber and detecting light reflected by the FBGs. The interrogator outputs dynamic strain measurements based on interferometry performed on the reflected light.

24 Claims, 5 Drawing Sheets

(58) Field of Classification Search
CPC .... G02B 6/4429; G02B 6/443; G02B 6/4434; G01D 5/35383; G01D 5/35387; G01B 11/16; G01B 11/161
USPC ........................................................ 356/35.5
See application file for complete search history.

(56) References Cited

U.S. PATENT DOCUMENTS

| | | | |
|---|---|---|---|
| 6,840,114 B2 | 1/2005 | Niezgorski et al. | |
| 7,789,214 B2 | 9/2010 | Bergeron et al. | |
| 7,920,270 B2 | 4/2011 | Chow et al. | |
| 2002/0025097 A1* | 2/2002 | Cooper | G01D 5/35383 385/12 |
| 2002/0064330 A1* | 5/2002 | Croteau | G01D 5/268 385/12 |
| 2003/0038231 A1* | 2/2003 | Bryant | E21B 47/06 250/227.14 |
| 2006/0045408 A1 | 3/2006 | Jones et al. | |
| 2008/0281209 A1* | 11/2008 | Arkwright | G01D 5/35303 600/478 |
| 2012/0099097 A1 | 4/2012 | Coupe et al. | |
| 2012/0143525 A1* | 6/2012 | Chen | G01L 1/246 702/42 |
| 2014/0150563 A1 | 6/2014 | Lambert et al. | |
| 2015/0322769 A1* | 11/2015 | Ruffa | E21B 47/0006 356/32 |
| 2017/0153155 A1 | 6/2017 | Hull et al. | |

OTHER PUBLICATIONS

International Search Report and Written Opinion of the International Searching Authority, dated Mar. 9, 2015, for corresponding International Application No. PCT/CA2014/050645, 8 pages.

* cited by examiner

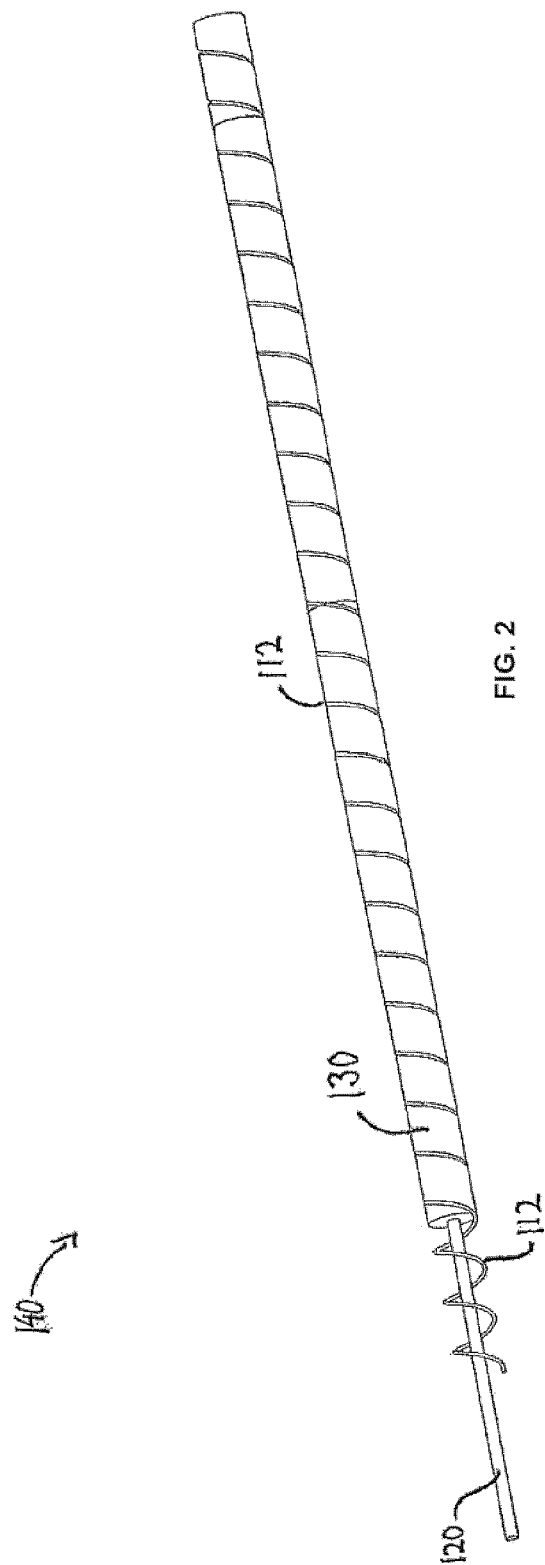

DEVICE AND SYSTEM FOR DETECTING DYNAMIC STRAIN

CROSS REFERENCE TO RELATED APPLICATIONS

This is the U.S. National Stage of International Application No. PCT/CA2014/050644, filed Jul. 4, 2014.

TECHNICAL FIELD

The present disclosure is directed at a device and system for detecting dynamic strain.

BACKGROUND

In a variety of industries, such as the oil and gas industry, the effect of dynamic strain on various components may be material for determining whether those components are functioning properly and for forecasting the expected life of those components. Dynamic strain may also be monitored for detecting failures in components such as well casing and pipelines. Research and development accordingly continue into methods, systems and techniques for detecting dynamic strain.

SUMMARY

According to a first aspect, there is provided a device for detecting dynamic strain, the device comprising a longitudinally extending carrier; and an optical fiber embedded along an outer surface of a length of the carrier, wherein the optical fiber comprises at least one pair of fiber Bragg gratings (FBGs) tuned to reflect substantially identical wavelengths.

The optical fiber may be embedded flush with or below the outer surface of the carrier.

The carrier may comprise a carrier lining with a groove in the outer surface of the carrier lining and the optical fiber positioned in the groove. The carrier may further comprise a coating which coats the optical fiber and fills any space in the groove between the carrier lining and the optical fiber.

The optical fiber may be embedded along the outer surface of the length of the carrier by extruding the carrier with the optical fiber.

The carrier may comprise a carrier lining and a coating with the optical fiber positioned on an outer surface of the carrier lining and the coating covering the optical fiber and the carrier lining.

The device may further comprise a longitudinally extending strength member, wherein the carrier surrounds at least a portion of the strength member.

The fiber may be embedded linearly along the outer surface of the length of the carrier.

The fiber may be embedded helically around the outer surface of the length of the carrier.

The pitch of the helix may be constant along the length of the housing.

The fiber may be embedded along a path that changes direction at least once by approximately 180°.

According to another aspect, there is provided a system for detecting dynamic strain, the system comprising any aspect of the device as described above; and an interrogator comprising a laser source and a photodetector, wherein the interrogator is configured to perform interferometry by shining laser light along the optical fiber and detecting light reflected by the FBGs, and wherein the interrogator outputs dynamic strain measurements based on interferometry performed on the reflected light.

The system may further comprise a signal processing device communicative with the interrogator.

The signal processing device may be configured to process the measurements to estimate where the dynamic strain is occurring.

The signal processing device may be configured to estimate magnitude of the dynamic strain.

The fiber may comprise at least one first pairs of the FBGs and at least one second pair of FBGs, the FBGs of the first pair may be tuned to a first wavelength and the FBGs of the second pair may be tuned to a second wavelength different from the first wavelength, the fiber between the first pair of FBGs and the second pair of FBGs may be embedded along different lengths of the carrier, and the interrogator may be configured to use wavelength division multiplexing to measure dynamic strain at the different lengths of the carrier.

The interrogator may be configured to: shine a reference light pulse and a sensing light pulse along the optical fiber and control timing of the light pulses such that the reference light pulse is delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse; detect a phase difference between the reflected reference light pulse and the reflected sensing light pulse of the combined interference pulse; and produce an output signal based on the phase difference detected.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIG. 2 is a perspective view of a device for detecting dynamic strain according to one embodiment.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment.

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. As described in further detail below, optical interferometry may be used to detect dynamic strain.

Figure 1A:
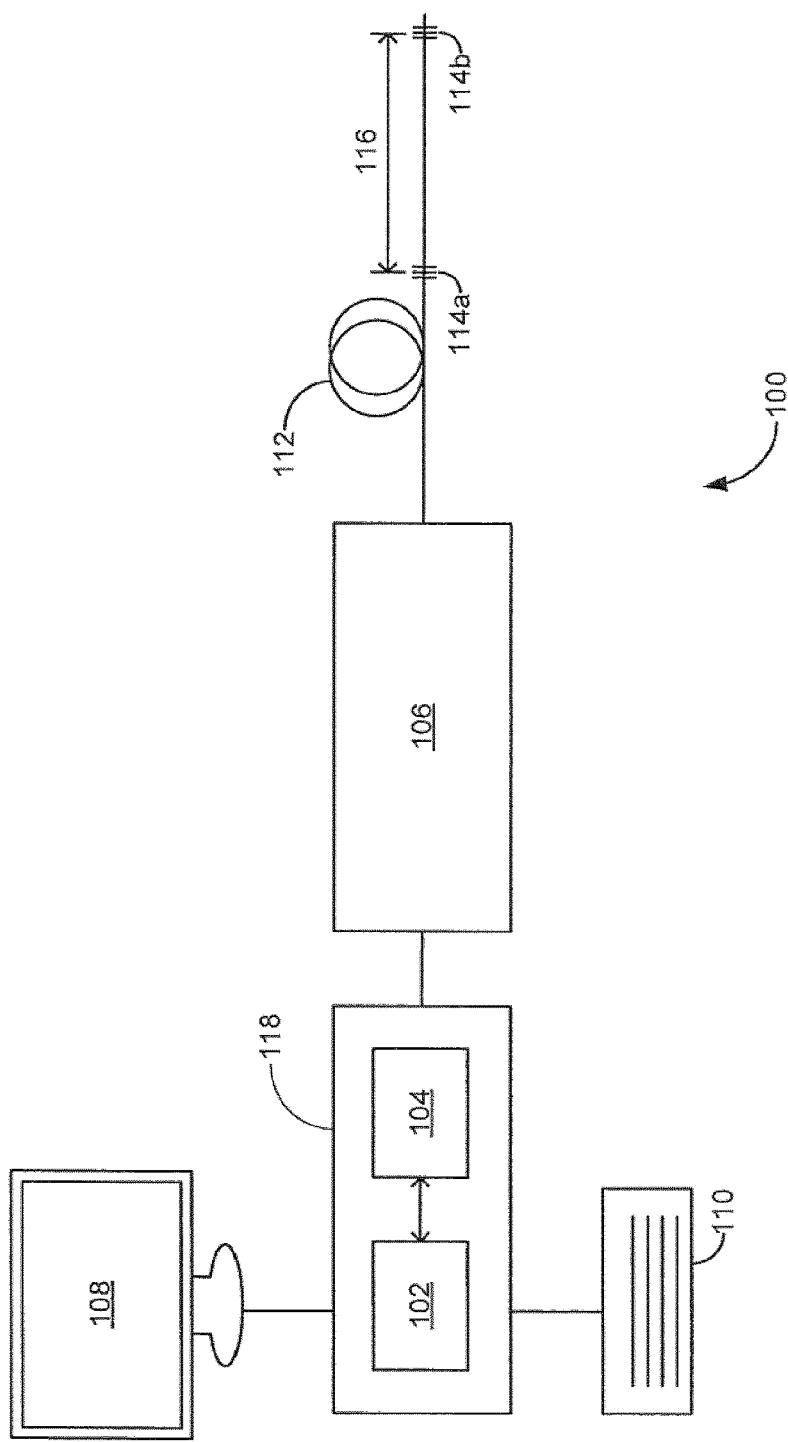
FIG. 1A is a block diagram of a system for detecting dynamic strain, which includes an optical fiber with fiber Bragg gratings ("FBGs") for reflecting a light pulse, according to one embodiment.

Referring now to FIG. 1A, there is shown one embodiment of a system 100 for detecting dynamic strain. The system 100 comprises the optical fiber 112, an interrogator 106 optically coupled to the optical fiber 112, and a signal processing device 118 that is communicative with the interrogator 106. While not shown in FIG. 1A, within the interrogator 106 are an optical source, optical receiver, and an optical circulator. The optical circulator directs light pulses from the optical source to the optical fiber 112 and directs light pulses received by the interrogator 106 from the optical fiber 112 to the optical receiver.

The optical fiber 112 comprises one or more fiber optic strands, each of which is made from quartz glass (amorphous $SiO_2$). The fiber optic strands are doped with a rare earth compound (such as germanium, praseodymium, or erbium oxides) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates sensing and reference pulses and outputs the reference pulse after the sensing pulse. The pulses are transmitted along optical fiber 112 that comprises a first pair of fiber Bragg gratings ("FBGs"). The first pair of FBGs comprises first and second FBGs 114a,b (generally, "FBGs 114"). The first and second FBGs 114a,b are separated by a certain segment 116 of the optical fiber 112 ("fiber segment 116"). The length of the fiber segment 116 varies in response to dynamic strain that the optical fiber 112 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the optical source 101. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, and the optical receiver 103 records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has encoded on it statements and instructions to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
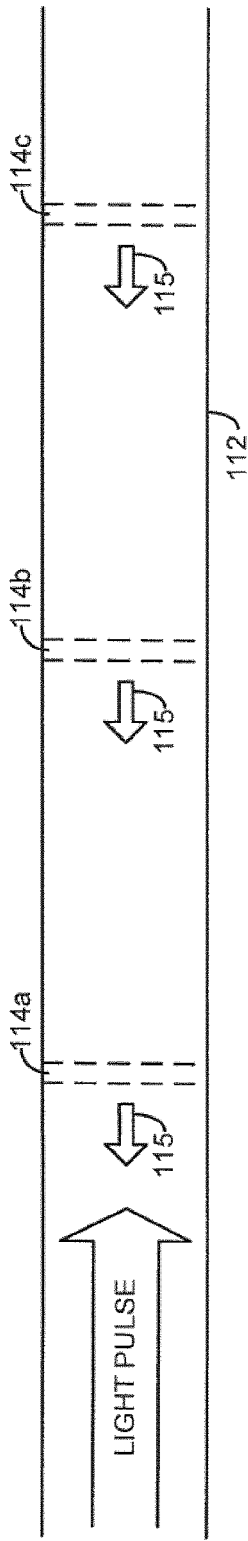
FIG. 1B is a schematic that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114*a,c* when the fiber 112 is not strained. The light pulse is propagating along the fiber 112 and encounters three different FBGs 114, with each of the FBGs 114 reflecting a portion 115 of the pulse back towards the optical receiver 101. In embodiments comprising three or more FBGs 114, the portions of the sensing and reference pulses not reflected by the first and second FBGs 114*a,b* can reflect off the third FBG 114*c* and any subsequent FBGs 114, resulting in interferometry that can be used to detect strain along the fiber 112 occurring further from the optical source 101 than the second FBG 114*b*. For example, in the embodiment of FIG. 1B, a portion of the sensing pulse not reflected by the first and second FBGs 114*a,b* can reflect off the third FBG 114*c* and a portion of the reference pulse not reflected by the first FBG 114*a* can reflect off the second FBG 114*b*, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference (θ) is as follows:

$$\theta = \frac{2\pi nL}{\lambda}$$

where n is the index of refraction of the optical fiber; L is the optical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
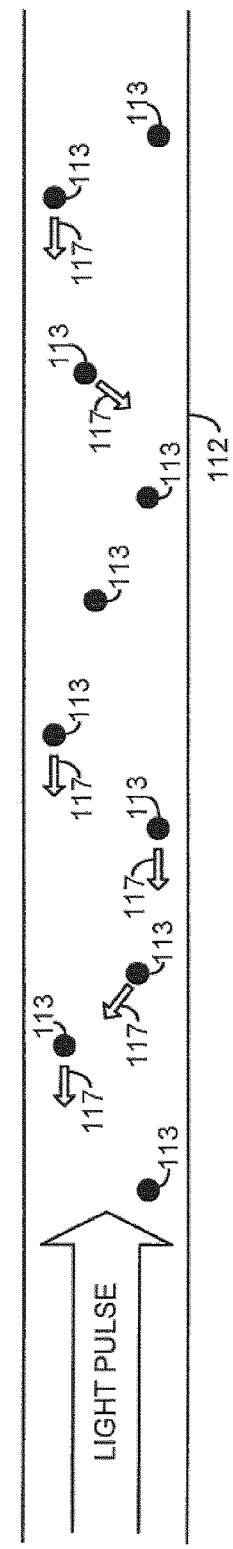
FIG. 1C is a schematic that depicts how a light pulse interacts with impurities in an optical fiber that results in scattered laser light due to Rayleigh scattering, which is used for distributed acoustic sensing ("DAS").
Figure 3:
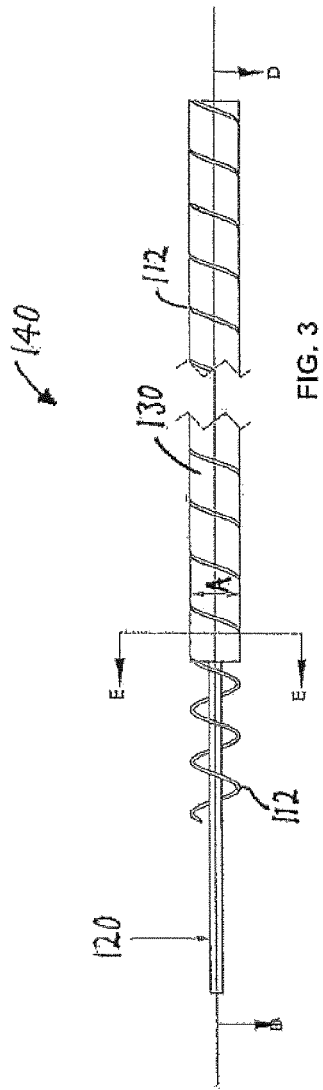
FIG. 3 is a side view of the device of FIG. 2.
Figure 4:
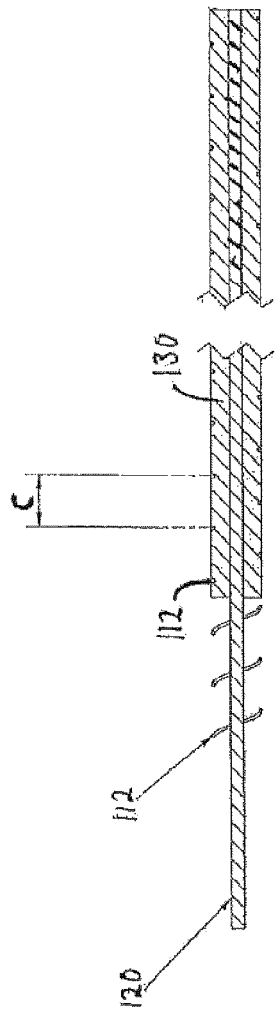
FIG. 4 is a cross-sectional view through line D-D of FIG. 3.

One conventional way of determining ΔnL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. In contrast, the embodiments described herein measure dynamic strain using interferometry resulting from laser light reflected by FBGs 114 that are added to the fiber 112 and that are designed to reflect significantly more of the light than is reflected as a result of Rayleigh scattering. This contrasts with an alternative use of FBGs 114 in which the center wavelengths of the FBGs 114 are monitored to detect any changes that may result to it in response to strain. In the depicted embodiments, groups of the FBGs 114 are located along the fiber 112. A typical FBG can have a reflectivity rating of 2% or 5%. The use of FBG-based interferometry to measure dynamic strain offers several advantages over DAS, in terms of optical performance.

In the embodiments described herein, the device for detecting dynamic strain comprises a longitudinally extending carrier and an optical fiber embedded along an outer surface of a length of the carrier. The optical fiber comprises at least one pair of fiber Bragg gratings (FBGs) tuned to reflect substantially identical wavelengths as discussed above. The fiber may be embedded along the outer surface of substantially the whole length of the carrier or a portion thereof. By embedded it is meant the carrier partially or completely surrounds or encloses the circumference of the optical fiber. For example, the carrier may comprise a carrier lining with a groove along its surface in which the optical fiber is positioned as described below. The circumference of the optical fiber positioned in the groove is partially enclosed or surrounded by the carrier lining. This is different to affixing or attaching the optical fiber to the outer surface of the carrier where the optical fiber is in contact with the carrier but is not surrounded or enclosed by the carrier. In some embodiments substantially the entire circumference of the optical fiber is surrounded or enclosed by the carrier, with the fiber being positioned along an outer surface of the carrier. For example, the carrier may comprise a carrier lining which receives the optical fiber and a coating or tape may be used to cover the optical fiber (and optionally the carrier lining) to embed the optical fiber along the outer surface of the carrier as described below. In embodiments where substantially the entire circumference of the optical fiber is surrounded or enclosed by the carrier, only a thin layer of the carrier (e.g. the coating or tape) covers the outer portion of the fiber so that the optical fiber is embedded along the outer surface of the carrier and is not encased within the carrier. Embedding the fiber along the outer surface of the carrier may beneficially protect the fiber while reducing dynamic strain dampener effect compared to known protective shields which encase an optical fiber or compared to known housings which house devices carrying an optical fiber.

Dynamic strain may be monitored to provide an indication that fluid is leaking from a housing. Dynamic strain may also be monitored to identify hotspots in a housing such as a conduit or vessel, which hotspots are experiencing strain over time and are more likely to fail. Dynamic strain may also be monitored for many other applications such as geosteering, pipeline collision detection, and pig tracking as is known in the art.

Referring now to FIGS. 2 to 5, there is shown an embodiment of a device 140 for detecting dynamic strain. The device 140 comprises a longitudinally extending carrier lining 130 surrounding a longitudinally extending strength member 120. Optical fiber 112 is positioned in a groove 134 in a helix pattern extending around the outer surface of the carrier lining 130. The pitch of a helix is the width of one complete helix turn, measured parallel to the axis of the helix (represented by arrow C in FIG. 4). The pitch of the groove 134 is constant along the length of the carrier lining 130, such that the spacing between each wrap of the fiber 112 is constant. In alternative embodiments, the pitch of the helix may vary along the length of the carrier lining 130. For example the helix of the fiber may have a hybrid pitch including an area of larger or coarser pitch (i.e. greater width between each helix turn, or few turns per unit of axial distance along the carrier lining 130) which provides lower spatial resolution for normal areas of monitoring, and an area of smaller or finer pitch (i.e. smaller width between each helix turn, or more turns per unit of axial distance along the carrier lining 130) which provides greater spatial resolution for areas which require more sensitive monitoring. In alternative embodiments (not shown), groove 134 may linearly extend along the carrier lining 130 or may have some other pattern, such as a wavy pattern.

The strength member 120 may be a metal or plastic tube, cable or any member which provides strength to the carrier lining 130. In alternative embodiments, the strength member may not be present. The carrier lining 130 may be formed by extruding the carrier material around the strength member 120 or the carrier lining 130 may include a longitudinally extending aperture therethrough to receive the strength member 120. The carrier lining 130 may be made of a resilient material with sufficient tensile strength to allow the material to be stretched in response to dynamic strain without breaking or failing. The carrier lining 130 may beneficially provide crush resiliency when deployed in a pressurized environment such as downhole drilling or pipelines. Suitable carrier materials include, but are not limited to, plastics, for example high temperature and formable or thermoset plastics, polyurethane or rubber. In alternative embodiments, the carrier lining 130 may also function as a strength member, for example the carrier lining 130 may be made of metal with the groove 134 machined in the outer surface of the metal carrier.

Figure 5:
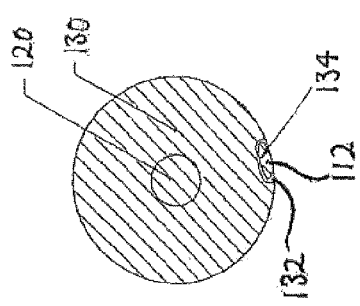
FIG. 5 is a cross-sectional view through line E-E of FIG. 3.

A protective coating 132 applied in the groove 134 coats the fiber 112 and fills any gaps between the carrier lining 130 and the fiber 112. The depth of the groove 134 is such that the fiber 112 has a thin layer of protective coating 132 on the outer surface of the fiber 112 which is generally flush with the outer surface of the carrier lining 130 as shown in FIG. 5. This may beneficially prevent the fiber 112 snagging on objects within the housing in which the device 140 is deployed and may protect the fiber 112 from damage. Suitable protective coatings are good transmitters of dynamic strain to allow transmission of dynamic strain from the dynamic strain source (e.g. fluid surround the carrier lining 130) to the fiber 112 whilst beneficially protecting the fiber from damage. The coating may be a formable or curable material, such as a formable plastic or a thermoset, thermoplastic or UV cured elastomer which can expand to fill the groove. As the coating material can be different to the carrier material, each can be selected for the function it performs, for example, the coating material can be selected for good dynamic strain transmission properties whereas the carrier material can be selected for resiliency and tensile strength properties. The coating material may be selected to have a coefficient of expansion corresponding to the coefficient of expansion of the carrier material. In alternative embodiments the coating 132 may not be present and the depth of the groove may be such that the fiber 112 is flush with or below the outer surface of the carrier lining 130 to protect the fiber 112. When the dynamic strain source is a pressurized fluid however, such as in a pressurized well, the protective coating 132 should be present to prevent fluid being forced up the groove 134 and out of the well.

The diameter A of the carrier lining 130 influences the curvature of the helix of the helically wound fiber 112. An increase in diameter A results in a corresponding increase in curvature of the helix, which may beneficially reduce fiber bend loss. An increase in curvature of the helix may also result in increased spatial resolution and sensitivity. Spatial resolution is increased as more fiber is being used and the FGBs 114 are brought closer together (i.e. higher spatial resolution in a linear sense). Diameter A is limited however by the diameter and function of the housing in which the device 140 is being deployed. For example, if the housing is a conduit with fluid flowing through the conduit, the diameter A of the carrier lining 130 may be limited to a size that does not exceed an acceptable level of flow resistance.

Figure 6:
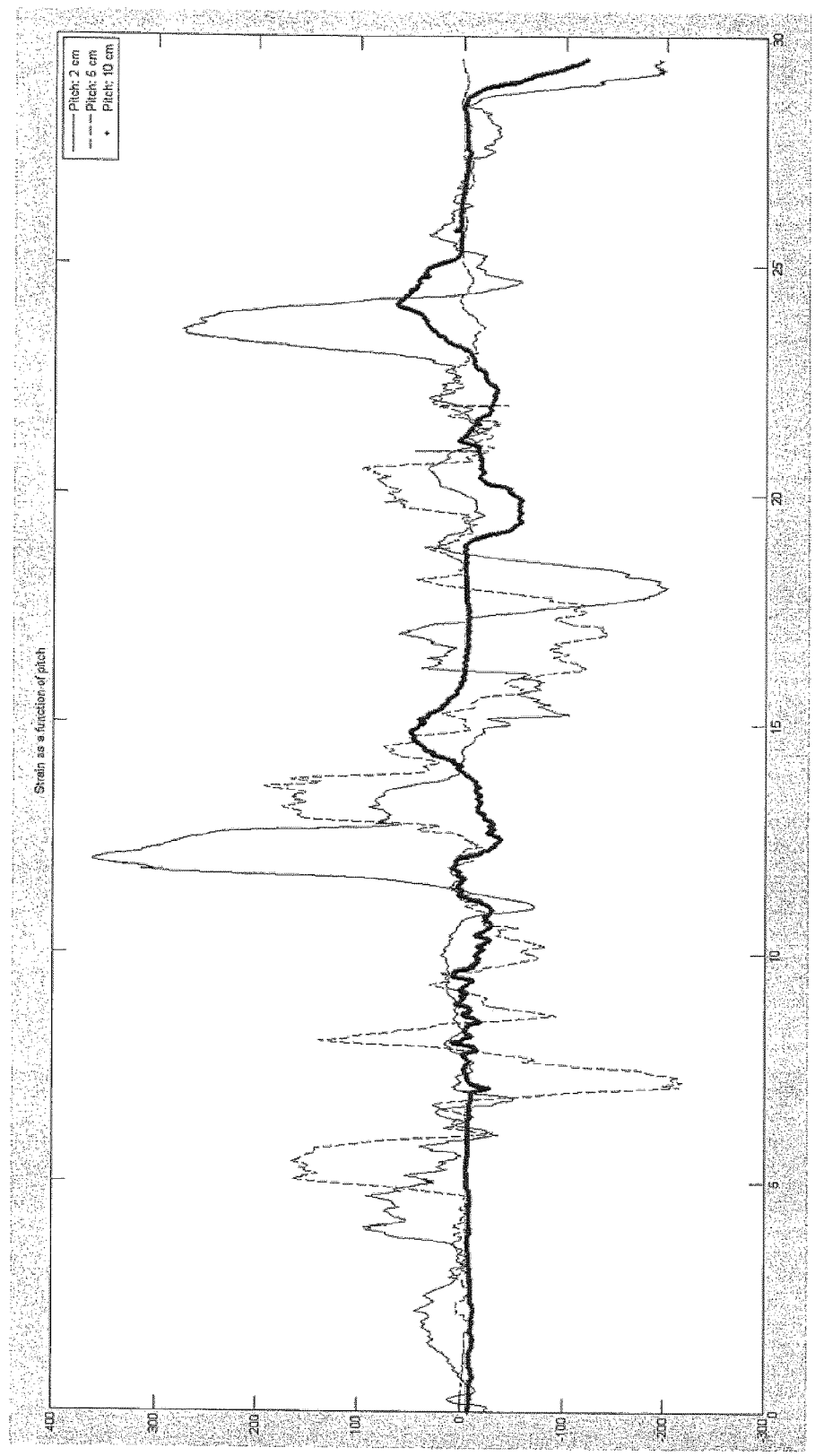
FIG. 6 is a graph of dynamic strain as a function of pitch where the pitch of a helical optical fiber is 2 cm, 5 cm and 10 cm.

The pitch of the helix of fiber 112 can be selected depending on the required spatial resolution and the desired signal-to-noise ratio (SNR). FIG. 6 shows dynamic strain as a function of pitch where the pitch of the helix of the helically wound fiber 112 is 2 cm, 5 cm and 10 cm. Generally, the smaller or finer the pitch (i.e. the smaller the width between each complete helix turn, or the more turns per unit of axial distance along the carrier lining 130), the higher the spatial resolution and SNR, however, other factors such as fiber diameter and the coating material can also affect SNR. When used in downhole drilling, the device 140 is typically deployed downhole using an injector or tractor with tooth-like protrusions to grip the device 140. The pitch of the helix may therefore be selected to be large enough to allow the injector protrusions to grip the carrier lining 130 without contacting the fiber 112 which may beneficially provide ease of deployment without damaging the fiber 112. When the optical fiber 112 is linearly embedded along the outer surface of the carrier lining 130, the tooth-like protrusions are generally able to grip the device without contacting the fiber 112.

In alternative embodiments (not shown) the carrier lining 130 may not be provided with grooves 134 and the fiber 112 may be embedded along an outer surface of the carrier in some other way, such as extruding the carrier with the fiber. Alternatively, the fiber may be laid on top of the carrier lining 130, such as helically wrapping the fiber around the carrier lining 130. A protective coating may be extruded over the carrier lining 130 and fiber 112, or tape may be stuck over the fiber 112 and optionally the carrier lining 130, to embed the fiber 112 along an outer surface of the carrier. In these embodiments the coating or tape make up part of the carrier. The protective coating or tape forms a thin layer over the fiber 112. More of the protective coating may be extruded on the carrier lining 130 between the fiber wrappings such that the outer diameter of the device 140 is substantially constant along its length to reduce snagging of the device 140 when it is deployed in a housing. Suitable protective coatings are as described above in more detail.

In alternative embodiments (not shown) multiple fibers 112 may be embedded along the outer surface of the carrier.

For example, multiple fibers 112 may be linearly embedded along the carrier in parallel longitudinal alignment around the circumference of the carrier. Provision of multiple optical fibers 112 linearly embedded in parallel longitudinal alignment along the outer surface of the carrier may provide more comprehensive detection of dynamic strain from the circumferential area surrounding the carrier as the dynamic strain will be detected by optical fiber 112 in closest proximity with the source of the dynamic strain. Alternatively multiple fibers 112 may be embedded in a different pattern, for example, a first fiber may be embedded linearly and a second fiber may be embedded helically along an outer surface of the carrier. In alternative embodiments (not shown), one or more additional optical fibers may be positioned inside the carrier, for example inside strength member 120 which may be a hollow metal or plastic tube.

In use when the carrier is subjected to dynamic strain caused by vibration or sound, this results in corresponding strain or pull on the optical fiber 112 embedded along the outer surface of the carrier. The length of the fiber segment 116 varies in response to the amount of strain the fiber 112 is experiencing and thus changes the phase of the signal received by the interrogator 106 as discussed above in more detail. The device and system of the described embodiments may be used to monitor changes in frequency of dynamic strain. Alternatively, or additionally, the system and device may be used to monitor changes in magnitude of dynamic strain. A change in magnitude of dynamic strain may indicate an acoustic event in housing in which the device is deployed. The change in strain magnitude can indicate stretch, compression, elongation or shear of the housing. If the applied strain changes with time, the magnitude of the observed strain will also change in time, and a particular frequency will be observed. The system may be used to estimate where along the housing the dynamic strain is occurring. This information could be used to provide an indication of where a leak is occurring or for other applications such as geosteering, pipeline collision detection, identification of hotspots, and pig tracking as is known in the art.

The device and system of the described embodiments may be used to detect and monitor dynamic strain of, or in, a variety of housings over large or small distances. For example the device may be deployed in a housing for detecting dynamic strain in the housing. In addition, the device may be positioned outside the housing, for example within a few meters from the exterior surface of the housing. For example, the housing may be a pipeline and the device may be buried in the ground near the pipeline to detect acoustics of the pipeline. The device may be buried between two pipelines (for example equidistance between both pipelines) and used to detect acoustics in both pipelines. The housing may be a vessel, such as a fluid storage vessel. Alternatively, the housing may be a conduit of any cross-sectional shape or size, for example a tubular, pipeline, or casing of an oil and gas well. The device and system may also be used to detect and monitor dynamic strain of a physical area over large or small distances, for example a perimeter of a building, an oil and gas well, or any area, where the device is deployed in the physical area being monitored.

It is contemplated that any part of any aspect or embodiment discussed in this specification can be implemented or combined with any part of any other aspect or embodiment discussed in this specification.

For the sake of convenience, the exemplary embodiments above are described as various interconnected functional blocks. This is not necessary, however, and there may be cases where these functional blocks are equivalently aggregated into a single logic device, program or operation with unclear boundaries. In any event, the functional blocks can be implemented by themselves, or in combination with other pieces of hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A device for detecting dynamic strain, the device comprising:
   (a) a longitudinally extending carrier;
   (b) an optical fiber embedded along an outer surface of a length of the carrier, wherein the optical fiber comprises at least one pair of fiber Bragg gratings (FBGs) tuned to reflect substantially identical wavelengths; and
   (c) a longitudinally extending strength member, wherein the carrier completely surrounds at least a longitudinally extending portion of the strength member.

2. The device of claim 1, wherein the optical fiber is embedded to be flush with or below the outer surface of the carrier.

3. The device of claim 1, wherein the carrier comprises a carrier lining with a groove in the outer surface of the carrier lining and the optical fiber is positioned in the groove.

4. The device of claim 3, wherein the carrier further comprises a coating which coats the optical fiber and fills any space in the groove between the carrier lining and the optical fiber.

5. The device of claim 1, wherein the optical fiber is embedded along the outer surface of the length of the carrier by extruding the carrier with the optical fiber.

6. The device of claim 1, wherein the carrier comprises a carrier lining and a coating with the optical fiber positioned on an outer surface of the carrier lining and the coating covering the optical fiber and the carrier lining.

7. The device of claim 1 wherein the optical fiber is embedded linearly along the outer surface of the length of the carrier.

8. The device of claim 1 wherein the optical fiber is embedded helically around the outer surface of the length of the carrier.

9. The device of claim 8 wherein the pitch of the helix is constant along the length of the carrier.

10. The device of claim 8, wherein the pitch of the helix varies along the length of the carrier.

11. The device of claim 1 wherein the optical fiber is embedded along a path that changes direction at least once by approximately 180°.

12. The device of claim 1, wherein the longitudinally extending portion of the strength member is a tube.

13. A system for detecting dynamic strain, the system comprising:
   (a) a device for detecting dynamic strain, the device comprising:
      (i) a longitudinally extending carrier;
      (ii) an optical fiber embedded along an outer surface of a length of the carrier, wherein the optical fiber comprises at least one pair of fiber Bragg gratings (FBGs) tuned to reflect substantially identical wavelengths; and (iii) a longitudinally extending strength member, wherein the carrier completely surrounds at least a longitudinally extending portion of the strength member; and (b) an interrogator comprising a laser source and a photodetector, wherein the interrogator is configured to perform interferometry by shining laser light along the optical fiber and detecting light reflected by the FBGs, and wherein the interrogator outputs dynamic strain measurements based on interferometry performed on the reflected light.

14. The system of claim 13 further comprising a signal processing device communicative with the interrogator.

15. The system of claim 14 wherein the signal processing device is configured to process the measurements to estimate where the dynamic strain is occurring.

16. The system of claim 14 wherein the signal processing device is configured to estimate magnitude of the dynamic strain.

17. The system of claim 13 wherein the optical fiber comprises at least one first pair of the FBGs and at least one second pair of FBGs, the FBGs of the first pair are tuned to a first wavelength and the FBGs of the second pair are tuned to a second wavelength different from the first wavelength, the optical fiber between the first pair of FBGs and the second pair of FBGs is embedded along different lengths of the carrier, and the interrogator is configured to use wavelength division multiplexing to measure dynamic strain at the different lengths of the carrier.

18. The system of claim 13, wherein the interrogator is configured to:

shine a reference light pulse and a sensing light pulse along the optical fiber and control timing of the light pulses such that the reference light pulse is delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse;

detect a phase difference between the reflected reference light pulse and the reflected sensing light pulse of the combined interference pulse; and produce an output signal based on the phase difference detected.

19. The system of claim 13, wherein the longitudinally extending portion of the strength member is a tube.

20. A method for detecting dynamic strain of a pipeline, comprising:

(a) shining laser light along the optical fiber of a device for detecting dynamic strain buried in the ground near the pipeline, the device comprising:
(i) a longitudinally extending carrier;
(ii) an optical fiber embedded along an outer surface of a length of the carrier, wherein the optical fiber comprises at least one pair of fiber Bragg gratings (FBGs) tuned to reflect substantially identical wavelengths; and
(iii) a longitudinally extending strength member, wherein the carrier completely surrounds at least a longitudinally extending portion of the strength member; and (b) detecting light reflected by the FBGs and performing interferometry on the reflected light to produce dynamic strain measurements based on the interferometry.

21. The method of claim 20, wherein the shining laser light step comprises shining a reference light pulse and a sensing light pulse along the optical fiber, the reference light pulse being delayed compared to the sensing light pulse by a predetermined period of time selected such that the reference light pulse reflected by a first FBG of the pair of FBGs interferes with the sensing light pulse reflected by a second FBG of the pair of FBGs to form a combined interference pulse, and wherein the detecting light reflected by the FBGs and performing interferometry step comprises detecting the combined interference pulse and detecting a phase difference between the reflected reference light pulse and the reflected sensing light pulse of the combined interference pulse to produce the dynamic strain measurements.

22. The method of claim 20, wherein the longitudinally extending portion of the strength member is a tube.

23. The method of claim 20, further comprising burying the device in the ground near the pipeline without touching the pipeline.

24. The method of claim 23, wherein the optical fiber is buried between two pipelines and used to detect dynamic strain of both pipelines.

* * * * *